United States Patent
Mizoguchi (10) Patent No.: US 11,648,940 B2
(45) Date of Patent: May 16, 2023

(54) VEHICLE DRIVING CONTROL SYSTEM

(71) Applicant: SUBARU CORPORATION, Tokyo (JP)

(72) Inventor: Masato Mizoguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/730,170

(22) Filed: Dec. 30, 2019

(65) Prior Publication Data
US 2020/0282984 A1 Sep. 10, 2020

(30) Foreign Application Priority Data

Mar. 6, 2019 (JP) .............................. JP2019-040831

(51) Int. Cl.
*B60W 30/095* (2012.01)
*B60W 40/09* (2012.01)
(Continued)

(52) U.S. Cl.
CPC ........ *B60W 30/0956* (2013.01); *B60W 40/09* (2013.01); *G05D 1/0061* (2013.01); *G05D 1/0214* (2013.01); *B60W 2050/143* (2013.01)

(58) Field of Classification Search
CPC .. B60W 30/14; B60W 30/143; B60W 30/146; B60W 30/16; B60W 30/162;
(Continued)

(56) References Cited

U.S. PATENT DOCUMENTS 9,878,663 B1 * 1/2018 Kochura ............... B60W 40/08
10,252,729 B1 * 4/2019 Goldman-Shenhar ......................
B60W 40/09
(Continued)

FOREIGN PATENT DOCUMENTS

JP 2001138767 A * 5/2001
JP 2007-253820 A 10/2007
(Continued)

OTHER PUBLICATIONS

JP-2001138767-A. English translation of the description. 2001. (Year: 2001).*
(Continued)

*Primary Examiner* — Nicholas Kiswanto
*Assistant Examiner* — Madison B Emmett
(74) *Attorney, Agent, or Firm* — McDermott Will & Emery LLP (57) ABSTRACT

A vehicle driving control system has an automatic driving mode for automatic driving. The system includes a driver monitor, a driver abnormal state detector, a risk state detector, and an alarm controller. The driver monitor monitors, as a driver, an occupant in a vehicle compartment that can take over driving from the system during the automatic driving mode. The driver abnormal state detector detects an abnormal state of the driver based on a monitoring result by the driver monitor. The risk state detector detects, as a risk state, at least one of a control state or a traveling environment of the vehicle in the automatic driving mode. The alarm controller controls an alarm to be output to the driver during traveling in the automatic driving mode based on at least the risk state out of the abnormal state of the driver and the risk state of the automatic driving mode.

7 Claims, 3 Drawing Sheets

(51) Int. Cl.
  *G05D 1/02* (2020.01)
  *G05D 1/00* (2006.01)
  *B60W 50/14* (2020.01)

(58) Field of Classification Search
  CPC ..... B60W 2554/4047; B60W 30/0956; B60W 40/09; B60W 2050/143; B60W 50/14; B60W 60/0015; B60W 60/005; B60W 60/0051; B60W 2040/0818; B60W 2540/103; B60W 2540/22; B60W 2540/221; B60W 2540/225; B60W 2540/229; B60W 2540/24; G05D 1/0061; G05D 1/0214; G05D 1/0055
  See application file for complete search history.

(56) References Cited

U.S. PATENT DOCUMENTS

| | | | |
|---|---|---|---|
| 2005/0030184 A1 | 2/2005 | Victor | |
| 2009/0027212 A1* | 1/2009 | Nakagoshi | G08B 21/06 340/575 |
| 2012/0154156 A1* | 6/2012 | Kuntzel | G08B 21/06 340/575 |
| 2014/0139655 A1* | 5/2014 | Mimar | G08B 21/0476 348/77 |
| 2016/0194000 A1* | 7/2016 | Taki | B60W 30/08 701/70 |
| 2017/0291543 A1* | 10/2017 | Goldman-Shenhar | B60Q 9/00 |
| 2018/0037216 A1* | 2/2018 | Otake | B60W 30/12 |
| 2018/0065549 A1 | 3/2018 | Watanabe et al. | |
| 2018/0284759 A1* | 10/2018 | Michalakis | B60W 30/16 |
| 2019/0072957 A1 | 3/2019 | Fujimura et al. | |
| 2019/0107398 A1* | 4/2019 | Erlenbach | G01C 21/3885 |
| 2019/0213429 A1* | 7/2019 | Sicconi | G06F 3/016 |
| 2019/0257418 A1* | 8/2019 | Iwanaka | F16H 61/22 |
| 2019/0259227 A1* | 8/2019 | Oesterling | G07C 5/008 |
| 2020/0070848 A1* | 3/2020 | Ozer | B60K 28/06 |
| 2020/0201349 A1* | 6/2020 | Ha | G08G 1/166 |
| 2020/0207357 A1* | 7/2020 | McCormick | B60W 10/18 |
| 2020/0231182 A1* | 7/2020 | Oba | B60W 40/09 |

FOREIGN PATENT DOCUMENTS

| | | |
|---|---|---|
| JP | 2007-528815 A | 10/2007 |
| JP | 2017-207955 A | 11/2017 |
| JP | 2018-041328 A | 3/2018 |
| JP | 6439667 B2 | 12/2018 |

OTHER PUBLICATIONS

Japanese Notice of Reasons for Refusal issued in corresponding Japanese Patent Application No. 2019-040831, dated Dec. 6, 2022, with English translation.

* cited by examiner

VEHICLE DRIVING CONTROL SYSTEM

CROSS-REFERENCE TO RELATED APPLICATIONS

The present application claims priority from Japanese Patent Application No. 2019-040831 filed on Mar. 6, 2019, the entire contents of which are hereby incorporated by reference.

BACKGROUND

The technology relates to a vehicle driving control system having an automatic driving mode for causing a vehicle to travel under automatic driving.

A driving control system having an automatic driving mode for enabling traveling without requiring a driver's driving operation has been recently developed to be put into practical use for vehicles such as automobiles. In this driving control system for automatic driving, when it is determined that it is difficult to continue the automatic driving due to malfunction of a vehicle or the like, it is necessary to warn the driver that it is difficult to continue the automatic driving, and to entrust the driving of the vehicle to the driver.

For instance, Japanese Patent No. 6439667 discloses a following technique of issuing an alarm. In a case where it is determined that it is impossible to continue automatic driving, when a driver holds a steering wheel and a driver's visual line directs forward, an alarm is issued by using a head-up display. On the other hand, in one of or both of a state where the driver does not hold the steering wheel and a state where the driver's visual line does not direct forward, an alarm is issued by using a sound output device or a vibration output device in addition to the head-up display.

SUMMARY

An aspect of the technology provides a vehicle driving control system having an automatic driving mode for causing a vehicle to travel under automatic driving. The system includes a driver monitor, a driver abnormal state detector, a risk state detector, and an alarm controller. The driver monitor is configured to monitor, as a driver, an occupant in a vehicle compartment that can take over driving from the driving control system during traveling in the automatic driving mode. The driver abnormal state detector is configured to detect an abnormal state of the driver based on a monitoring result by the driver monitor. The risk state detector is configured to detect, as a risk state, at least one of a control state or a traveling environment of the vehicle in the automatic driving mode. The alarm controller is configured to control an alarm to be output to the driver during traveling in the automatic driving mode based on at least the risk state out of the abnormal state of the driver and the risk state of the automatic driving mode.

An aspect of the technology provides a vehicle driving control system having an automatic driving mode for causing a vehicle to travel under automatic driving. The system includes circuitry. The circuitry is configured to monitor, as a driver, an occupant in a vehicle compartment who can take over driving from the driving control system during driving in the automatic driving mod. The circuitry is configured to detect an abnormal state of the driver based on a monitoring result of the driver. The circuitry is configured to detect, as a risk state, at least one of a control state or a traveling environment of the vehicle in the automatic driving mode. The circuitry is configured to control an alarm to be output to the driver during traveling in the automatic driving mode based on at least the risk state out of the abnormal state of the driver and the risk state of the automatic driving mode.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Even in a case where automatic driving can be continued and a vehicle is traveling under automatic driving, it is desirable to surely arouse the driver's attention in a traveling state having a higher degree of risk than usual such as an accelerating traveling state, a traveling state on a curve with a large curvature, or traveling in rain weather or on a snowy road, and even in a case where automatic driving cannot be continued, it is desirable to quickly respond to this situation.

Therefore, it is desirable to provide a vehicle driving control system that can surely arouse the driver's attention in a driving state having a higher degree of risk than usual even during traveling under automatic driving.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
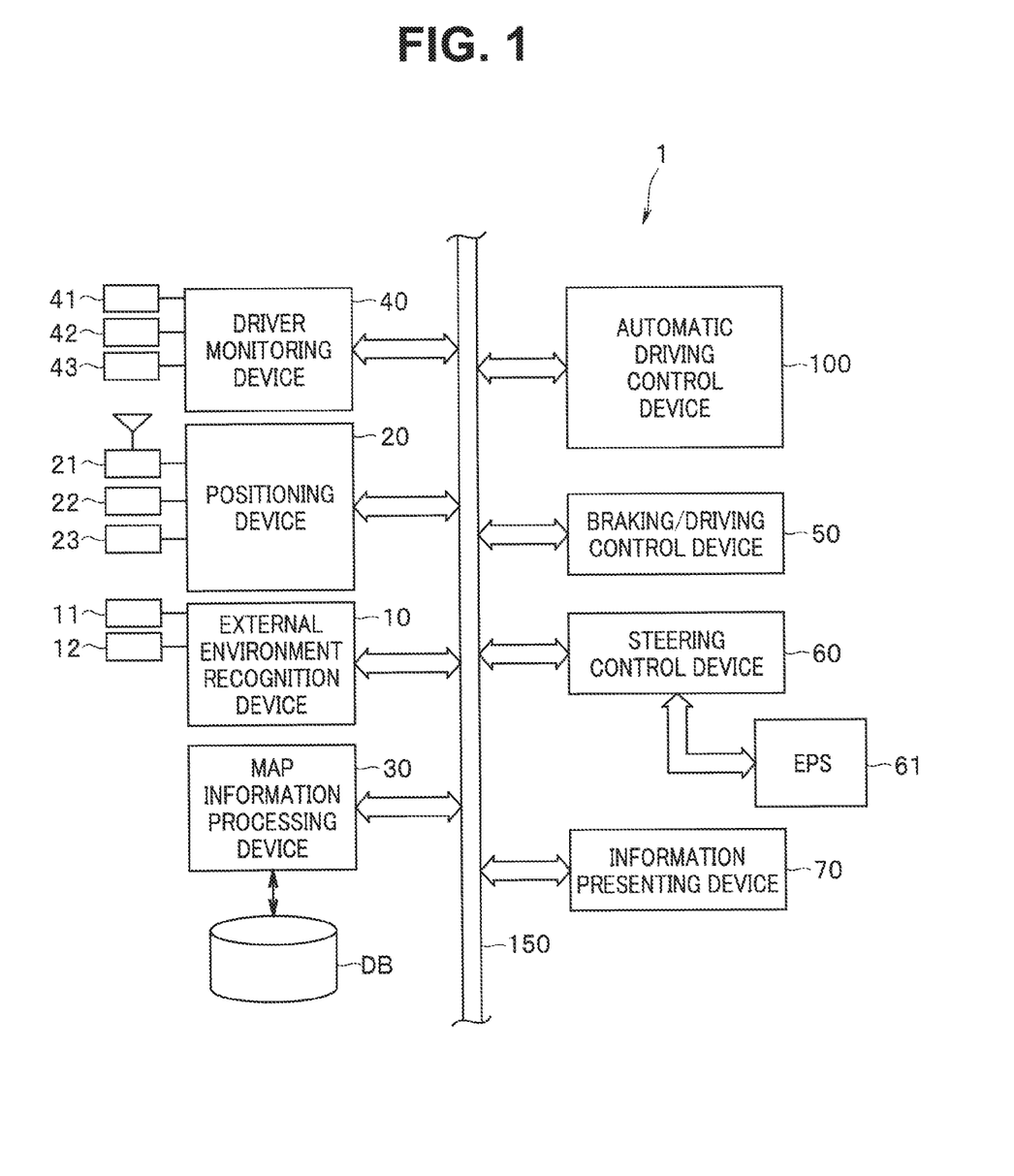
FIG. 1 is an overall configuration diagram of a driving control system.

FIG. 1 is an overall configuration diagram of the driving control system according to an embodiment of the technology. The driving control system 1 illustrated in FIG. 1 is installed in a vehicle such as an automobile, and enables driving support for supporting a driver's driving operation and automatic driving that does not require the driver's driving operation. Specifically, the driving control system 1 includes an automatic driving control device 100 serving as a main component, an external environment recognition device 10, a positioning device 20, a map information processing device 30, a driver monitoring device 40, a braking/driving control device 50, a steering control device 60, an information presenting device 70 and the like, which are connected to one another through a communication bus 150 in a network connection style.

The external environment recognition device 10 recognizes an external environment around a vehicle (own vehicle) in which the driving control system 1 is installed. The external environment recognition device 10 includes various devices configured to recognize an environment such as a camera unit 11 and a radar device 12 such as a millimeter wave radar or a laser radar. The external environment recognition device 10 recognizes the external environment around the own vehicle based on detection information on objects around the own vehicle detected by the camera unit 11, the radar device 12, etc., traffic information acquired by infrastructure communication such as road-to-vehicle communication and vehicle-to-vehicle communication, position information of the own vehicle measured by the positioning device 20, map information from the map information processing device 30 and the like.

In the external environment recognition device 10, for instance, when a stereo camera configured by two cameras that capture images of the same object from different viewpoints is mounted as the camera unit 11 in the own vehicle, a pair of right and left images captured by the stereo camera are subjected to stereo processing to recognize the external environment three-dimensionally. The camera unit 11 as the stereo camera is configured, for instance, by disposing two shutter-synchronized color cameras each having an imaging element such as CCD or CMOS on right and left sides in a vehicle width direction with a predetermined baseline length in the vicinity of a room mirror inside the windshield at an upper part of the vehicle compartment.

The pair of right and left images captured by the camera unit 11 as the stereo camera is subjected to matching processing to determine a pixel shift amount (parallax) at corresponding positions between the right and left images, and the pixel shift amount is converted into luminance data or the like to generate a distance image. Points on the distance image are coordinate-transformed to points in a real space with the own vehicle centered therein according to the principle of triangulation, and a lane line (lane) of a road on which the own vehicle travels, obstacles, vehicles traveling ahead of the own vehicle, etc., are three-dimensionally recognized.

A road lane line as a lane can be recognized by extracting a point group as candidates for a lane line from the image and calculating a straight line or a curved line connecting the candidate points. For instance, within a lane line detection region set on the image, edges which change in luminance by a predetermined value or more on a plurality of search lines set in a horizontal direction (vehicle width direction) are detected, and a pair of a lane line start point and a lane line end point are detected for each search line, whereby an intermediate region between the lane line start point and the lane line end point is extracted as lane line candidate points.

Time-series data of spatial coordinate positions of lane line candidate points based on a vehicle movement amount per unit time are processed to calculate a model approximating the right and left lane lines, thereby recognizing the lane lines. As a lane line approximating model, an approximate model obtained by connecting linear components obtained by the Hough transform, or a model approximated by a curve such as a quadratic equation can be used.

The positioning device 20 mainly performs positioning based on signals from a plurality of navigation satellites such as Global Navigation Satellite System (GNSS) satellites, and detects the vehicle position of the own vehicle. When the positioning accuracy deteriorates due to a capturing state of signals (radio waves) from the satellites, the influence of multipath caused by reflection of radio waves or the like, the positioning device 20 detects the vehicle position of the own vehicle by performing the positioning based on autonomous navigation using in-vehicle sensors such as a gyro sensor 22 and a vehicle speed sensor 23 in combination.

According to the positioning based on the plurality of navigation satellites, signals containing information on the orbit, time, etc., transmitted from the navigation satellites are received via a receiver 21, and the own position of the own vehicle is measured as an absolute position containing longitude, latitude, altitude, and time information based on the received signals. Furthermore, according to the positioning based on the autonomous navigation, the position of the own vehicle as a relative positional change is measured based on the traveling azimuth of the own vehicle detected by the gyro sensor 22 and the moving distance of the own vehicle calculated from a vehicle speed pulse output from the vehicle speed sensor 23 or the like.

The map information processing device 30 includes a map database DB, and specifies and outputs the position on the map data of the map database DB based on the position data of the own vehicle measured by the positioning device 20.

The map database DB is a database that holds a high-precision map created for control of traveling containing automatic driving, and is stored in a large-capacity storage medium such as a hard disk drive (HDD) or a solid state drive (SSD).

Specifically, the high-precision map is configured as a multi-dimensional map (dynamic map) that holds static information such as road shapes and connection relationships among roads and dynamic information such as traffic information collected by the infrastructure communication in multiple layers. Road data includes types of road lane lines, the number of traveling lanes, a widths of the traveling lanes, point sequence data indicating the center position in a width direction of the traveling lane, curvature of the traveling lane, a traveling azimuth angle of the traveling lane, a speed limit, etc., and are stored together with attribute data such as data reliability and data update date.

Further, the map information processing device 30 performs maintenance management of the map database DB, verifies nodes, links, and data points of the map database DB to keep them in an up-to-date state at all time, and creates and adds new data for areas where no data exists on the database, thereby configuring a more detailed database. Update of data and addition of new data in the map database DB are performed by collating the position data measured by the positioning device 20 with the data stored in the map database DB.

The driver monitoring device 40 functions as a driver monitor for monitoring, as a driver, an occupant who can perform a driving operation in the vehicle compartment on respective function units of the automatic driving control device 100 described later, particularly an occupant in the vehicle compartment who can take over driving from the driving control system 1 and perform the driving operation during traveling under automatic driving. The driver monitoring device 40 transmits a driver state as a driver monitoring result to the automatic driving control device 100.

The driver state includes the driver's wakefulness level and physical condition, a motion associated with a driver's driving operation, and the like, and is detected by a plurality of sensors such as a visual sensor 41, a biological sensor 42, and a cancel switch 43 for canceling a risk reduction mode described later, which are installed in the vehicle compartment. A camera, a near infrared LED, a radar, an ultrasonic sensor, or the like, which is installed in the vehicle compartment, is used as the visual sensor 41. Furthermore, a camera, a near infrared LED, a radar, an ultrasonic sensor, a temperature sensor, a vibration sensor, or the like is used as the biological sensor 42.

The driver monitoring device 40 detects driver's facial expression, driver's hand motion and the like by the visual sensor 41, and also detects biological information such as presence/absence of driver's breathing, heart rate, blood pressure, body temperature, and brain waves. As described later, the automatic driving control device 100 detects an abnormal state of the driver based on information from the driver monitoring device 40.

The braking/driving control device 50 controls traveling driving force to be generated by an electric motor or an internal combustion engine, and also controls the traveling speed of the own vehicle, switching between forward driving and reverse driving, braking, and the like. For instance, the braking/driving control device 50 controls a driving state of the engine based on signals from various sensors that detect the driving state of the engine and various control information acquired via the communication bus 150, and controls braking devices (not illustrated) for four wheels independently of the driver's braking operation based on a brake switch, wheel speeds of the four wheels, a steering angle, a yaw rate, and other vehicle information. Furthermore, the braking/driving control device 50 calculates brake fluid pressure of each wheel based on braking force of each wheel, and engages an anti-lock braking system, sideslip prevention control and the like.

The steering control device 60 controls the steering torque by an electric power steering device (EPS) 61 provided in a steering system, for instance, based on the vehicle speed, the driver's steering torque, the steering angle, the yaw rate, and other vehicle information. The control of the steering torque is executed as current control for the electric motor of the EPS device 61 that realizes a target steering torque for making the actual steering angle coincide with the target steering angle. The EPS device 61 uses the target steering torque from the steering control device 60 as an instruction torque to control a driving current of the electric motor corresponding to the instruction torque, for instance, by PID control.

The information presenting device 70 is a device that controls output of an alarm at the time of abnormality occurring in various device of the vehicle or at the time of alerting the driver, and various kinds of information to be presented to the driver. For instance, warnings and control information are presented by using at least one of a visual output such as a monitor, a display or an alarm lamp, or an auditory output such as a speaker or a buzzer. During execution of traveling control containing automatic driving, the information presenting device 70 presents the control state of the traveling control to the driver, and when the traveling control containing the automatic driving is suspended by a driver's operation, the information presenting device 70 presents the driving state at that time to the driver.

Next, the automatic driving control device 100 serving as a main component of the driving control system 1 will be described. When the driver operates a switch, a panel (not illustrated) or the like to select a driving support mode for supporting the driver's driving operation or an automatic driving mode requiring no driver's driving operation in a manual driving mode in which the driver drives the own vehicle by performing all the driving operations such as steering, acceleration and deceleration, and braking, the automatic driving control device 100 performs the traveling control via the braking/driving control device 50 and the steering control device 60 based on information from the external environment recognition device 10, the positioning device 20, and the map information processing device 30.

Note that in the present embodiment, the driving support mode means a driving mode which requires the driver to hold the steering wheel or steer, and automatically performs at least one of acceleration/deceleration control or steering control, and contains partially automatic driving. On the other hand, the automatic driving mode means a driving mode presupposing hands-off driving in which the driver does not touch the steering wheel, and is a conditional automatic driving mode in which all of the acceleration/deceleration control and the steering control are automatically performed in an operation region in design where an automatic operation function operates normally. In the automatic driving mode, when it is difficult to continue the operation by the system, the driving is entrusted to the driver.

The automatic driving control device 100 includes a control function unit associated with each driving mode as described above.

Figure 2:
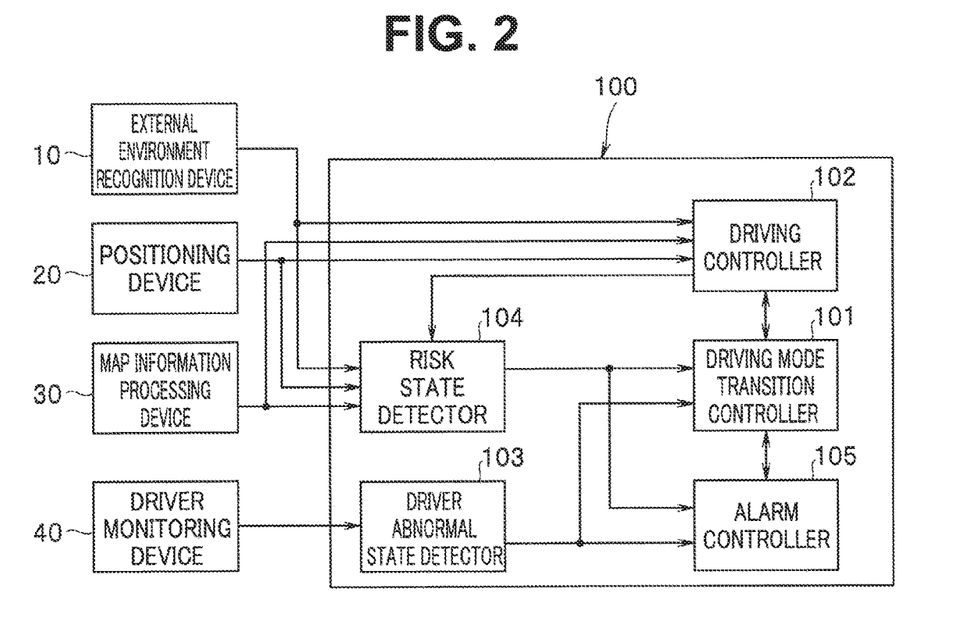
FIG. 2 is a block diagram illustrating functions of an automatic driving control device.

FIG. 2 is a block diagram illustrating functions of the automatic driving control device. As illustrated in FIG. 2, the automatic driving control device 100 includes a driving mode transition controller 101, a driving controller 102, a driver abnormal state detector 103, a risk state detector 104, and an alarm controller 105. The driving controller 102 mainly controls the automatic driving mode, and performs the automatic driving mode while containing control of a driving support mode.

The driving mode transition controller 101 determines the driving mode of the own vehicle according to an operation input by the driver from a driving mode setting switch, an operation panel, or the like, and notifies the driving controller 102 of the driving mode. In the present embodiment, the driving mode is set to the manual driving mode in an initial state when the system is activated, and the driving mode transition controller 101 transitions the driving mode among the manual driving mode, the driving support mode, and the automatic driving mode.

When the driver performs an operation such as holding the steering wheel, steering with a steering torque of a set value or more, stepping on a brake pedal, or stepping on an accelerator pedal during traveling under automatic driving, the driving mode transition controller 101 regards these driver's operations as an override operation, cancels the automatic driving mode and transitions the driving mode to the manual driving mode by the driver.

Furthermore, when the driver does not respond to a takeover request described later to be performed when it is impossible to continue the automatic driving, the driving mode transition controller 101 instructs the driving controller 102 to cease the automatic driving and transitions the driving mode from the automatic driving mode to the risk reduction mode. The risk reduction mode is a driving mode for reducing a risk during the automatic driving, and ensures safety by decelerating the vehicle. In the present embodiment, the risk reduction mode includes, for instance, a retreat mode for searching a place (retreat place) such as a roadside zone where the vehicle can be safely stopped, and causing the vehicle to automatically travel to the retreat place while decelerating the vehicle and stop there.

In the retreat mode, the driving mode transition controller 101 disables the driver's override operation and disables the transition to the manual driving mode in order to ensure safety against an operation unintended by the driver. Thereafter, when the driver turns on the cancel switch or the like after the own vehicle has reached the retreat place and the driver has stopped a traveling driving source such as the electric motor or the engine, the retreat mode is canceled.

When the driving mode notified from the driving mode transition controller 101 is the automatic driving mode and a road condition, a geographical condition, an environmental condition, etc., satisfy conditions for the automatic driving, the driving controller 102 automatically performs acceleration/deceleration control and the steering control on the own vehicle. In the automatic driving, when a destination and a traveling route are specified in advance, the vehicle automatically travels to the destination along the traveling route while appropriately setting the vehicle speed matched with a surrounding traffic environment, distances to other vehicles, and a lane. When neither a destination nor a traveling route is specified, the vehicle automatically travels along the lane.

When a condition for enabling the automatic driving to be continued (automatic driving condition) is not satisfied during traveling under automatic driving, the driving controller 102 outputs a takeover request for requesting the takeover of the driving to the driver. For instance, when it becomes difficult to continue the automatic driving because abnormality occurs in a portion of the system or the vehicle gets out of the operation range of the automatic driving or the like, or when the driver abnormal state detector 103 detects driver's distracted driving or drowsy driving or determines that the driver is not in a state capable of driving normally because of deterioration of driver's physical condition, the driving controller 102 determines that the automatic driving condition is not satisfied, stores control information on the vehicle position and speed, etc., in automatic driving up to that time point, and outputs the takeover request for requesting the driver to take over the driving.

The takeover request is notified to the driving mode transition controller 101, and is also notified to the alarm controller 105, and the driver is warned from the alarm controller 105 via the information presenting device 70. When the driver reacts to gaze forward and operates the steering wheel, the brake pedal or the like, cancel of the alarm is instructed from the driving mode transition controller 101 to the alarm controller 105, and stop of the control of the automatic driving mode is instructed to the driving controller 102. As a result, the driving mode is transitioned from the automatic driving mode to the manual driving mode by the driver himself or herself. On the other hand, when the driver does not respond to the takeover request, the driving mode transition controller 101 instructs the driving controller 102 to stop the automatic driving and perform control in the risk reduction mode.

Figure 3:
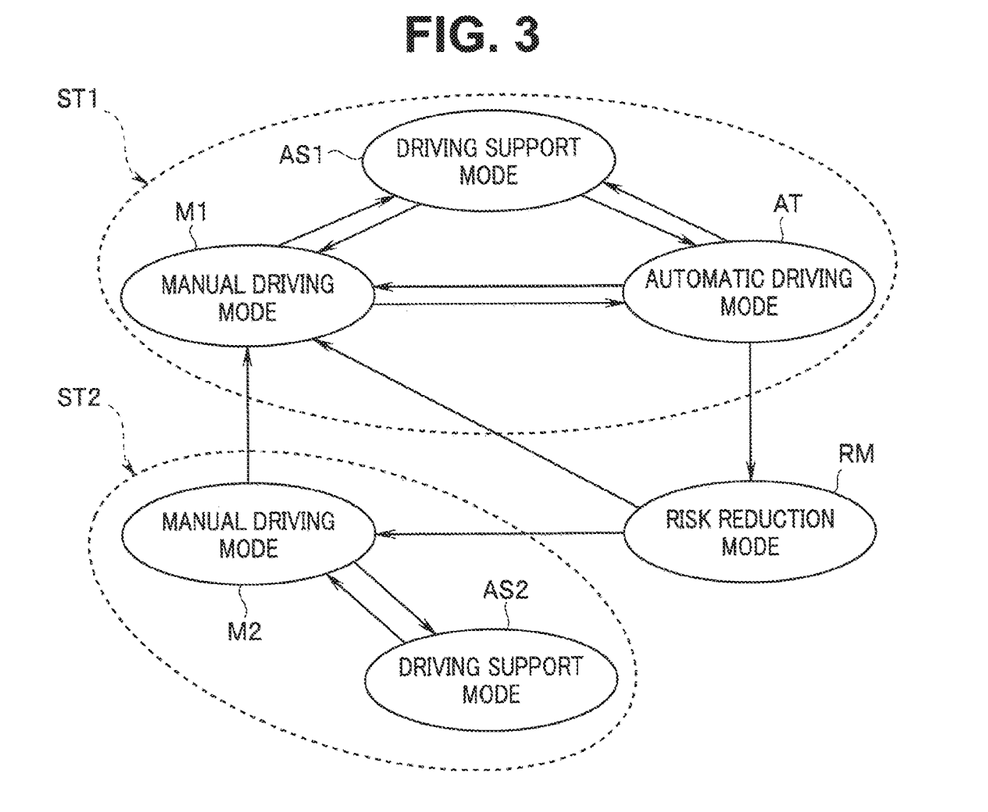
FIG. 3 is an explanatory diagram illustrating transition of a driving mode.

Here, the transition among the respective driving modes will be described. FIG. 3 is an explanatory diagram illustrating the transition of the driving mode. In the present embodiment, as illustrate in FIG. 3, there are transitions in a state ST1 and transitions in a state ST2.

The state ST1 represents a normal state before the transition to the risk reduction mode such as the retreat mode occurs, and it is possible to transition among the manual driving mode M1, the driving support mode AS1, and the automatic driving mode AT. The state ST2 represents a state after the risk reduction mode is canceled halfway, and is a state in which it is possible to transition between the manual driving mode M2 and the driving support mode AS2.

The manual driving mode M1 and the manual driving mode M2 are the same manual driving mode, but they indicate that a range capable of transitioning is different therebetween. Likewise, the driving support mode AS1 and the driving support mode AS2 are the same driving support mode, but they indicate that a range capable of transitioning is different therebetween.

The risk reduction mode RM is interposed between the state ST1 and the state ST2. When the driving mode transitions from the automatic driving mode AT to the risk reduction mode RM, there is a case where the driving mode returns from the risk reduction mode RM to the manual driving mode M1 in the state ST1 because the risk reduction mode RM has ended, and a case where the risk reduction mode RM is canceled halfway through the risk reduction mode RM, and the driving mode transitions from the risk reduction mode RM to the manual driving mode M2 in the state ST2.

When the driving mode transitions to the manual driving mode M1 in the state ST1 because the risk reduction mode RM has ended, it is possible to transition between the normal driving modes. For instance, even when the driving mode has transitioned to the risk reduction mode RM during automatic traveling to a destination, it is possible to resume the automatic traveling to the destination after confirming safety of the surrounding.

On the other hand, when the driving mode transitions to the manual driving mode M2 in the state ST2 halfway through the risk reduction mode RM, the driving mode that can be transitioned is temporarily restricted. Only the transition between the manual driving mode M2 and the driving support mode AS2 is possible until the restriction on the mode transition is canceled, and it is impossible to perform the automatic traveling in the automatic driving mode AT. When the restriction on the mode transition is canceled, the state transitions from the state ST2 to the state ST1.

For instance, when the vehicle has traveled for a certain period of time in a state where the driver abnormal state detector 103 detects that the driver gazes forward and holds the steering wheel, the driver abnormal state detector 103 determines that a condition for canceling the restriction on the mode transition is satisfied. As a result, the state ST2 is transitioned to the normal state ST1, and it is possible to perform the transition among the manual driving mode M1, the driving support mode AS1, and the automatic driving mode AT.

The driver abnormal state detector 103 checks a driver state detected by the visual sensor 41 and the biological sensor 42 in the driver monitoring device 40 serving as the driver monitor, and detects an abnormal state where the driver cannot normally take over driving from the automatic driving. For instance, when the behavior of a visual line based on movement of a virtual image on a cornea caused by a driver's eye motion, the wakefulness level based on variation in the visual-line behavior and change in pupil area, the biological information on the presence or absence of driver's breathing, heart rate, blood pressure, body temperature, brain waves, etc., driver's face direction, driver's hand motion, etc., are detected as the driver state, the driver abnormal state detector 103 detects the driver's abnormal state based on at least one of these pieces of information.

For instance, when the driver abnormal state detector 103 detects that although the own vehicle has not changed the lane or there is no vehicle on an adjacent lane, the driver's face direction or the visual-line direction is equal to or more than a threshold value, and the driver is not gazing in the traveling direction, faces in a direction other than the traveling direction and thus falls into distracted driving for a set time or longer, the driver abnormal state detector 103 determines the driver state as the abnormal state where the driver cannot normally take over the driving from the automatic driving.

Furthermore, the driver abnormal state detector 103 checks whether a state where the driver's pupil area is equal to or less than a threshold value continues for a set time or longer, or whether the driver's biological information deviates from a preset reference value, and detects the abnormal state where the driver cannot normally take over the driving because the driver falls into drowsy driving or driver's health condition deteriorates.

The risk state detector 104 detects a risk state serving as an index representing magnitude of a risk included in the automatic driving mode based on information from the external environment recognition device 10, the positioning device 20, the map information processing device 30, and the driving controller 102. The risk state including at least one of the control state or the traveling environment of the vehicle is detected.

With respect to risk states based on the control state of the vehicle, for instance, when acceleration control to a target vehicle speed is being performed in the automatic driving mode, a degree of risk of the acceleration control is higher than that of constant-speed control and deceleration control, and thus the risk state detector 104 detects the acceleration during traveling as a risk state. In addition, the risk state detector 104 detects, as the risk states, control states of the vehicle such as a steering angle under automatic driving, a lateral position of the own vehicle with respect to the center of the lane, a yaw angle of the own vehicle with respect to the lane, a lighting state of a headlight, a wiper operating state, a recognition state of the traveling lane (lane line), etc.

Furthermore, the risk state detector 104 also detects, as risk states based on the traveling environment, the type of a traveling road (highway, general road), the curvature of a traveling lane, a weather condition during traveling (outside air temperature, crosswind, rainfall, snowfall), etc. All of a traveling state on an highway, a turning state on a curve with a large curvature, a state at a low outside air temperature, a strong-wind state, a rainfall state, a snowfall state, etc., are traveling environments that are more risky than normal environments, and the risk state detector 104 detects these driving environments as risk states.

The alarm controller 105 controls an alarm to be output to the driver during traveling in the automatic driving mode based on at least the risk state of the driver's abnormal state and risk state. The control of the alarm is performed by changing magnitude of the alarm or output timing of the alarm to be output to the driver via the information presenting device 70. For instance, in a case of an auditory alarm, the alarm controller 105 changes the magnitude of the output level (amplitude) of an alarm sound, and in a case of a visual alarm output, the alarm controller 105 changes the output level of light (light intensity) or the size of highlighted display.

For instance, during execution of acceleration control in which acceleration detected as the risk state is equal to or more than a preset acceleration, or under a traveling environment such as bad weather, the alarm controller 105 changes a threshold value for driver's face direction or visual-line direction to detect driver's distracted driving or drowsy driving so that the warning timing is earlier than usual, thereby promoting the driver to gaze forward early. As a result, even when a takeover request from the automatic driving to the manual driving is output, the driver can quickly take over the driving.

In this case, when a driver's abnormal state such as driver's distracted driving or drowsy driving continues for a set time or longer after an alarm is output, the alarm controller 105 transmits an acceleration suppressing instruction to the driving controller 102 and causes the driving controller 102 to perform control of suppressing the acceleration as compared with the normal control in the automatic driving mode. Furthermore, when the driver's abnormal state continues for a certain time or longer even after the acceleration is suppressed, the alarm controller 105 causes the driving mode transition controller 101 to transition the automatic driving mode controlled by the driving controller 102 to the risk reduction mode such as the retreat mode in which the vehicle is caused to automatically travel to the retreat place while decelerating the vehicle.

Figure 4:
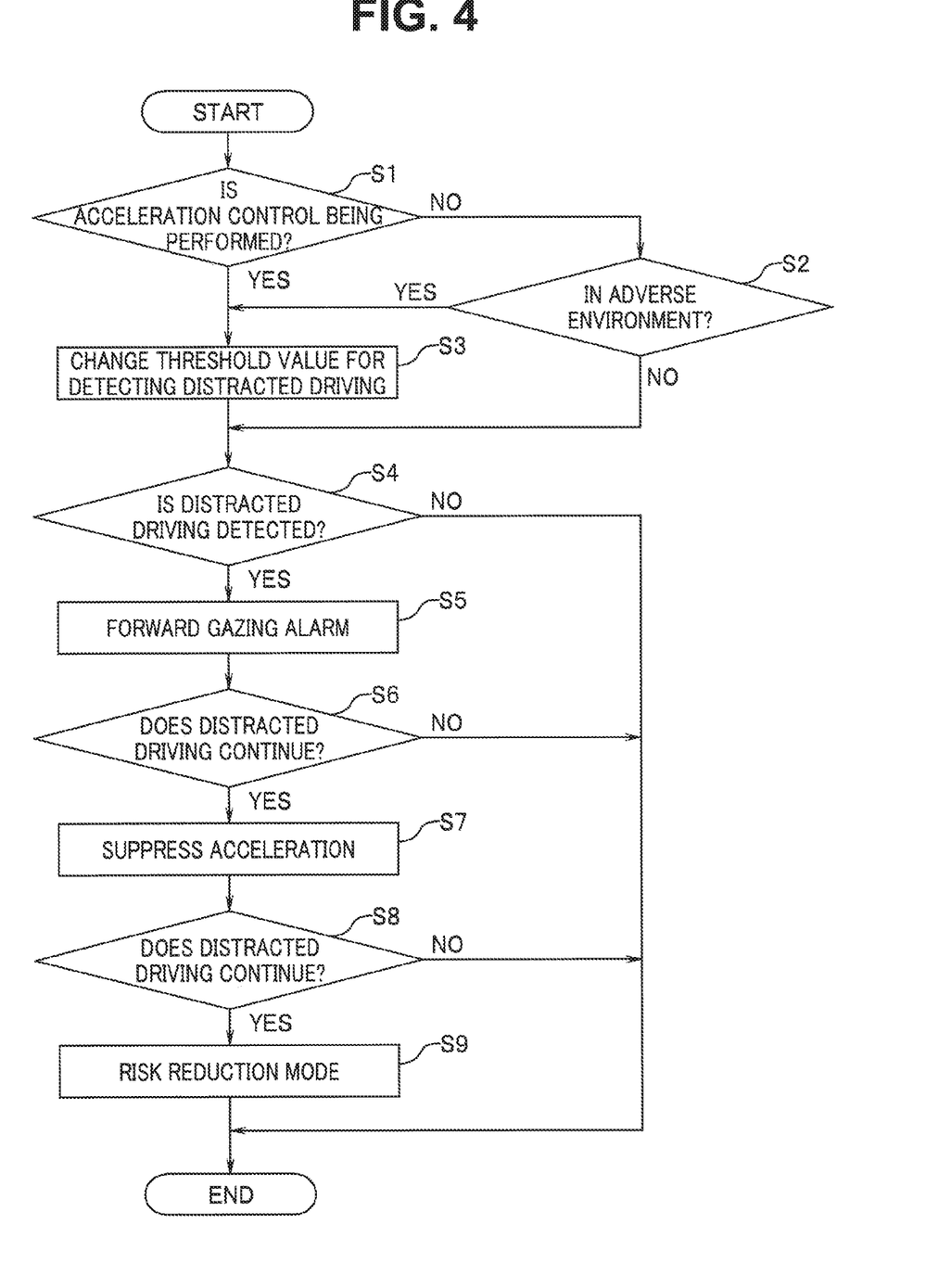
FIG. 4 is a flowchart illustrating alarm processing in an automatic driving mode.

Next, an operation associated with the alarm control of the driving control system 1 will be described while focusing on an operation of the automatic driving control device 100 exemplified in a flowchart of FIG. 4. FIG. 4 is a flowchart illustrating alarm processing in the automatic driving mode, and FIG. 4 illustrates examples of the alarm output and the acceleration suppression for the driver's distracted driving.

In the alarm processing of the automatic driving control device 100, in first step S1, the automatic driving control device 100 checks whether the acceleration control is being performed. When the acceleration control is not being performed, the automatic driving control device 100 further checks in step S2 whether traveling is performed under an adverse environment. When the acceleration control is being performed, the processing proceeds to step S3.

In step S2, the automatic driving control device 100 performs the processing of step S3 when determining that the own vehicle travels under the adverse environment, that is, the own vehicle travels under a more adverse condition than a normal condition like such a case that the radius of a forward curve is equal to or less than a threshold value (the curvature of a traveling road is equal to or more than a threshold value) or reliability of lane recognition (lane line recognition) deteriorates due to traveling under an adverse weather. When the vehicle travels under a normal environment that is not an adverse environment, the processing proceeds from step S2 to step S4.

In step S3, the automatic driving control device 100 changes the threshold value for detecting the distracted driving. For instance, when the distracted driving is detected from the driver's face direction or visual-line direction, the threshold value is changed so that even when change in the face direction or visual-line direction is smaller than usual the distracted driving is detected. Furthermore, the automatic driving control device 100 checks in step S4 whether the distracted driving is detected. When the distracted driving is not detected, the processing exits, and when the distracted driving is detected, the automatic driving control device 100 outputs a forward gazing alarm to promote the driver to gaze forward during driving in step S5.

In step S6, the automatic driving control device 100 further checks whether the driver's distracted driving still continues even after a preset time has elapsed after the output of the forward gazing alarm. When the forward gazing alarm has caused the driver to gaze forward, the processing exits, but when the driver's distracted driving continues despite the forward gazing alarm, the processing proceeds to step S7.

The automatic driving control device 100 performs the acceleration suppression in step S7, for instance, by reducing a target acceleration in the acceleration control or the like, and in step S8, checks whether the driver's distracted driving continues even when a certain time has elapsed after the acceleration is suppressed. When the driver resolves the distracted driving after the acceleration suppression, the processing exits. When the driver's distracted driving continues for a certain time or longer even after the acceleration is suppressed, in step S9, the automatic driving mode is transitioned to the risk reduction mode such as the retreat mode to ensure safety.

As described above, in the present embodiment, during traveling in the automatic driving mode, based on at least the risk state of the abnormal state such as the driver's distracted driving and the risk state based on the control state of the automatic driving and the traveling environment, an alarm to be output to the driver is controlled. The alarm control is performed by varying the alarm by increasing the alarm output level than usual or by making the alarm output timing earlier than usual.

As a result, the driver's attention can be surely aroused in such a driving situation that the degree of risk during traveling under the automatic driving increases, and when such a situation that the driver takes over driving from the automatic driving mode occurs, the driver can quickly take over the driving. In addition, when the driver's abnormal state such as distracted driving is not resolved after the alarm is output, the acceleration in the automatic driving mode is suppressed, and further the driving mode is transitioned to the risk reduction mode, so that the risk can be surely avoided, and safety can be secured.

The driving control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic driving control device 100 containing the driver monitoring device 40, the driver abnormal state detector 103, the risk state detector 104 and the alarm controller 105 (see FIG. 2). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules illustrated in FIGS. 1 and 2.

Although some embodiments of the technology have been described in the foregoing by way of instance with reference to the accompanying drawings, the technology is by no means limited to the examples described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle driving control system having an automatic driving mode for causing a vehicle to travel under automatic driving, the vehicle driving control system comprising:
  at least one processor; and
  at least one machine readable medium storing instructions that, when executed by the at least one processor, causes the at least one processor to:
    monitor a visual-line direction or a face direction of a driver in a vehicle compartment who can take over driving from the driving control system during traveling in the automatic driving mode;
    detect an abnormal state of the driver based at least on determining that the visual-line direction or the face direction of the driver monitored by the driver monitor is equal to or more than a threshold;
    when an acceleration to increase a speed of the vehicle toward a target speed in the automatic driving mode is equal to or more than a preset acceleration, decrease the threshold for detecting the abnormal state of the driver, the acceleration to increase the speed of the vehicle toward the target speed in the automatic driving mode being positive when the speed of the vehicle increases, the preset acceleration being a positive value greater than zero;
    control an alarm to be output to the driver during traveling in the automatic driving mode based on detecting the abnormal state of the driver; and
    suppress the acceleration to increase the speed of the vehicle toward the target speed in the automatic driving mode when the abnormal state of the driver continues for a set time or longer after the alarm is output.

2. The vehicle driving control system according to claim 1, wherein the at least one processor is configured to detect the abnormal state based further on an eye-closed state of the driver.

3. The vehicle driving control system according to claim 2, wherein the at least one processor is configured to control the alarm by changing magnitude or output timing of the alarm.

4. The vehicle driving control system according to claim 2, wherein the at least one processor is configured to transition the automatic driving mode to a risk reduction mode including deceleration control when the abnormal state of the driver continues for a certain time or longer even after the acceleration is suppressed.

5. The vehicle driving control system according to claim 1, wherein the at least one processor is configured to control the alarm by changing magnitude or output timing of the alarm.

6. The vehicle driving control system according to claim 1, wherein the at least one processor is configured to transition the automatic driving mode to a risk reduction mode including deceleration control when the abnormal state of the driver continues for a certain time or longer even after the acceleration is suppressed.

7. A vehicle driving control system having an automatic driving mode for causing a vehicle to travel under automatic driving, the vehicle driving control system comprising:
  circuitry configured to:
    monitor a driver of the vehicle in a vehicle compartment who can take over driving from the driving control system during driving in the automatic driving mode,
    detect an abnormal state of the driver based on a monitoring result of the driver,
    control an alarm to be output to the driver during traveling in the automatic driving mode based on detecting the abnormal state of the driver,
    set a timing of outputting the alarm to the driver in the abnormal state based on an acceleration to increase a speed of the vehicle toward a target speed in the automatic driving mode such that a timing of outputting the alarm to the driver in the abnormal state when the acceleration to increase a speed of the vehicle toward a target speed is equal to or more than a preset acceleration is set to be earlier than a timing of outputting the alarm to the driver in the abnormal state when the acceleration of the vehicle is less than the preset acceleration, the acceleration to increase the speed of the vehicle toward the target speed in the automatic driving mode being positive when the speed of the vehicle increases, the preset acceleration being a positive value greater than zero, and suppress the acceleration to increase the speed of the vehicle toward the target speed in the automatic driving mode when the abnormal state of the driver continues for a set time or longer after the alarm is output.

\* \* \* \* \*